March 11, 1958  W. B. SMITS  2,826,721
IGNITION APPARATUS FOR LIQUID FUELS
ESPECIALLY FOR OIL BURNER BOILERS
Filed May 28, 1954
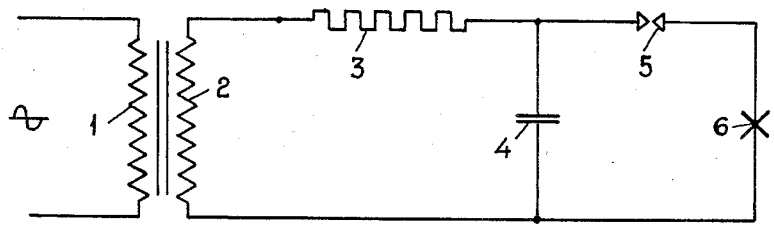
INVENTOR.
WYTZE BEYE SMITS,
BY
Robert B Pearson
ATTORNEY

United States Patent Office 2,826,721
Patented Mar. 11, 1958

2,826,721

IGNITION APPARATUS FOR LIQUID FUELS ESPECIALLY FOR OIL BURNER BOILERS

Wytze Beye Smits, Voorburg, Netherlands, assignor to Smitsvonk, N. V., Leidschendam, Netherlands, a company Application May 28, 1954, Serial No. 433,170

1 Claim. (Cl. 317—83)

The invention relates to an ignition circuit which is particularly well-suited for use with an oil burner.

In presently existing ignition systems for oil burners a torch is disposed in the boiler and a potential difference is generated between the two poles of this torch by means of a high voltage transformer. When the potential difference between the poles of the torch reach a certain value, sparks originate and the injected burner oil is ignited. The disadvantages inherent in such a construction are many and varied; for example, the insulation of the poles of the torch soon becomes filthy and the charge leaks off so that higher voltage is required for igniting the fuel. Furthermore, with continued use the pole points burn off so that the distance between the poles increases and the voltage required to produce the sparks must be correspondingly increased. The dangers in a system requiring such tremendously high voltages are obvious. In addition, when using a high voltage spark gap, an ever present problem is that of carbon collecting on the points so that the gap is short-circuited. Furthermore, a high tension spark can be easily blown out by a sudden air blast.

The present invention overcomes all of the foregoing disadvantages by providing a novel circuit which is capable of utilizing ordinary house current such as, for example, 60 cycle, 110 volt alternating current. The spark plug used with this circuit is one such as disclosed in applicant's Patent No. 2,125,035 issued July 26, 1938, for Electric Ignition System and Sparking Plug for Internal Combustion Engines. The essential feature of such spark plugs is that they employ relatively low voltages and provide a spark which, in effect, creeps across the surface of the plug. This creeping discharge is attained by providing a semi-conductor between the electrodes of the plug. The advantages derived from this arrangement are numerous, one of the principal novel results being the obviation of cleaning the plugs. The present invention utilizes such a plug in combination with a novel circuit for igniting liquid fuels and more particularly for igniting atomized burner oil.

The ignition circut includes a transformer to the primary winding of which is applied the available alternating current. From the secondary winding is taken a voltage suitable for use with the low tension spark plug previously referred to, such voltage being not more than 5,000 volts. This alternating voltage charges a condenser through a resistor. The charged condenser discharges across the spark plug through a spark gap which is incorporated in the circuit to assure that the maximum charge on the condenser is reached before the plug is fired. The resistor is so selected that the condenser is charged and discharged twice during every half cycle of the voltage. In this manner both the positive and negative half cycles of the voltage are utilized, and consequently the wear on the spark plug electrodes will be even since the direction of travel of the spark will be alternating. By selecting the value of the resistor so that the condenser is charged twice during each half cycle, it is unnecessary to provide a rectifier, since the voltage in the charging circuit is always higher than the voltage on the rectifier, and there is, therefore, no tendency for the condenser to discharge through the charging circuit.

A primary object of this invention is to provide an ignition circuit for liquid fuels and more particularly, for igniting atomized oil in a boiler which ignition circuit uses relatively low voltages and a sprak plug in which a semi-conductor is disposed between the electrodes.

Another object of this invention is to provide an ignition circuit in which both the positive and negative half cycles of alternating current are utilized to charge a condenser which, in turn, discharges through a spark plug, so that the electrodes of the spark plug are evenly worn.

Another object of the present invention is to provide a charging circuit for a condenser which discharges through a low voltage spark plug, the charging circuit being provided with a resistor so selected that the condenser will be charged twice during every half cycle of the alternating current so that the use of a rectifier is rendered superfluous.

Other objects and many of the attendant advantages of this invention will become apparent in the light of this specification when considered in connection with the accompanying drawing.

In the drawing, 1 is the primary winding of a transformer to which is applied the available alternating current. The secondary winding 2 provides alternating current of a voltage less than 5,000 volts and preferably approximately 2,000 volts. The alternating current charges an ignition condenser 4 through resistor 3. The low tension spark plug is shown at 6 and a spark gap 5 is provided in the discharge circuit of the condenser.

As pointed out hereinbefore, the resistor 3 is so selected that the condenser 4 is charged twice during each half cycle of the alternating current. In this manner, it is unnecessary to provide a rectifier in the charging circuit since the charging current is at all times of higher voltage than the voltage charge in the ignition condenser so that there is no danger of the condenser discharging through the charging circuit. The spark gap 5 insures that the maximum voltage on the condenser 4 will be reached prior to discharge through the plug 6. By utilizing both the positive and negative half cycles of the alternating charging current, even wear on the electrodes of the spark plug 6 is assured since the direction of travel of the spark will alternate.

It can be seen that there has been provided an ignition circuit which is adapted for use in igniting liquid fuels at places where it is desired to use the available alternating current supply. The circuit herein described is useful only with low voltage spark plugs since there is insufficient voltage developed for firing the ordinary spark plugs.

Having thus described the invention it is apparent that numerous changes in design and construction of the same may be employed without departing from the essentials thereof. What is claimed as new and desired to be secured by Letters Patent is:

An ignition circuit comprising, in combination, a transformer having primary and secondary windings, the primary winding being connected to an alternating current source, the secondary winding providing a voltage of approximately 2,000 volts and being connected to a condenser through a resistor, a discharge circuit for said condenser including a spark gap and a low voltage spark plug, said spark gap being provided to prevent gradual discharge of said condenser, said resistor having a value such that said condenser discharges through the spark plug more than one time during each half cycle of the alternating current, the voltage charge in the condenser being at all times lower than the voltage in the charging circuit.

References Cited in the file of this patent

UNITED STATES PATENTS

| | | |
|---|---|---|
| 1,466,209 | Eichbaum | Aug. 28, 1923 |
| 1,537,903 | Lepel | May 12, 1925 |
| 2,125,035 | Smits | July 26, 1938 |
| 2,395,600 | Weisglass | Feb. 26, 1946 |
| 2,551,101 | Debenham | May 1, 1951 |

FOREIGN PATENTS

| | | |
|---|---|---|
| 259,115 | Germany | Apr. 24, 1913 |
| 186,918 | Great Britain | July 26, 1923 |
| 160,655 | Germany | Oct. 10, 1941 |
| 574,775 | Great Britain | Jan. 21, 1946 |